(12) United States Patent
Hashimoto et al.

(10) Patent No.: US 6,598,670 B1
(45) Date of Patent: Jul. 29, 2003

(54) VEHICLE AIR-CONDITIONER

(75) Inventors: Shiho Hashimoto, Chita-gun (JP); Yoshihiko Okumura, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/707,171

(22) Filed: Nov. 6, 2000

(30) Foreign Application Priority Data

Nov. 11, 1999 (JP) ............................................ 11-321631

(51) Int. Cl.$^7$ ................................................ B60H 1/00
(52) U.S. Cl. ........................ 165/204; 165/42; 165/202; 454/160; 454/121
(58) Field of Search ............................ 165/42, 43, 202, 165/203, 204; 454/160, 161, 121, 156; 62/244

(56) References Cited

U.S. PATENT DOCUMENTS

| | | | | |
|---|---|---|---|---|
| 3,809,151 A | * | 5/1974 | Scheidel et al. ............... | 165/42 |
| 4,216,822 A | * | 8/1980 | Izumi .......................... | 165/42 |
| 4,482,009 A | * | 11/1984 | Nishimura et al. ........ | 165/43 X |
| 4,852,638 A | * | 8/1989 | Hildebrand et al. ...... | 165/43 X |
| 4,940,083 A | * | 7/1990 | Takenaka et al. .......... | 165/43 X |
| 5,042,566 A | * | 8/1991 | Hildebrand .................. | 165/42 |
| 5,042,567 A | * | 8/1991 | Kajimoto et al. ........ | 165/43 X |
| 5,154,223 A | * | 10/1992 | Ishimaru et al. ............ | 165/42 |
| 5,267,896 A | * | 12/1993 | Petters et al. ............ | 165/42 X |
| 5,305,823 A | * | 4/1994 | Elliot ........................ | 165/42 X |
| 5,711,368 A | * | 1/1998 | Ito et al. ..................... | 165/42 |
| 5,884,689 A | * | 3/1999 | Takechi et al. ............. | 165/43 |
| 5,992,506 A | * | 11/1999 | Nagaya et al. .............. | 165/42 |
| 6,062,298 A | * | 5/2000 | Lee ............................ | 165/42 |
| 6,206,092 B1 | * | 3/2001 | Beck et al. ................ | 165/203 |
| 6,244,335 B1 | * | 6/2001 | Nakamura et al. ......... | 165/203 |
| 6,293,339 B1 | * | 9/2001 | Uemura et al. ............ | 165/203 |
| 6,352,102 B1 | * | 3/2002 | Takechi et al. ............. | 165/42 |
| 6,415,857 B1 | * | 7/2002 | Nakamura et al. ......... | 165/204 |
| 6,427,771 B1 | * | 8/2002 | Kako et al. ................ | 165/204 |
| 6,460,607 B1 | * | 10/2002 | Shibata ...................... | 165/42 |

FOREIGN PATENT DOCUMENTS

| | | | | |
|---|---|---|---|---|
| JP | 62-125911 | * | 6/1987 | ................. 165/43 |
| JP | 57-130815 | * | 8/1992 | ................. 165/43 |
| JP | A8-268039 | | 10/1996 | |

* cited by examiner

Primary Examiner—Ljiljana Ciric
(74) Attorney, Agent, or Firm—Harness, Dickey & Pierce, PLC (57) ABSTRACT

In a vehicle air conditioner, a defroster opening and a foot opening are provided at both right and left sides of a face opening. An outlet portion of a warm air passage has an enlarged portion offset to right and left side of the outlet portion of the cool air passage. During a bi-level mode, cool air from the cool air passage flows toward the face opening, and warm air from the warm air passage flows toward the foot opening, On the other hand, during a foot/defroster mode, cool air from the cool air passage and warm air from the warm air passage are mixed at an Inlet portion of the foot opening and the defroster opening and the mixed air is introduced into the foot opening and the defroster opening.

5 Claims, 13 Drawing Sheets

VEHICLE AIR-CONDITIONER

CROSS-REFERENCE TO RELATED APPLICATION

This application is related to and claims priority from Japanese Patent Application No. Hei. 11-321631 filed on Nov. 11, 1999, the contents of which are hereby incorporated by reference.

BACKGROUND OF THE INVENTION

1. Field of the Invention

The present invention relates to a vehicle air conditioner in which air having a suitable temperature can be blown into each air opening through which air is blown into a passenger compartment, even when a foot opening is provided at a cool air passage side and both a face opening and a defroster opening are provided at a warm air passage side from a mounting condition on a vehicle.

2. Description of Related Art

In a conventional vehicle air conditioner described in JP-A-8-268039, temperature of air blown into a passenger compartment is adjusted by adjusting a ratio between a cool air amount and a warm air amount, while a foot opening is provided at a side of a cool air passage, and both a face opening and a defroster opening are provided at a side of a warm air passage. Further, a guide plate or a guide shaped portion is provided, so that warm air from a heating heat exchanger is introduced toward a lower-side foot opening, and cool air from a cool air passage is introduced toward an upper-side face or defroster opening. However, during a foot/defroster mode or a foot mode, because the guide operation of cool/warm air due to the guide shaped portion of a foot door is the same as that during a bi-level mode that is generally set in a middle season to have a predetermined temperature difference between air blown toward a vehicle upper side and a vehicle lower side. Accordingly, when the foot/defroster mode is set in the winter, the temperature of air blown from the defroster opening is greatly lowered as compared with the temperature of air blown from the foot opening, and therefore, the heating performance for the passenger compartment and the defrosting performance of a windshield are deteriorated.

SUMMARY OF THE INVENTION

In view of the foregoing problems, it is an object of the present invention to provide a vehicle air conditioner having a foot opening at a cool air passage side and face and defroster openings at a warm air passage side, in which an air temperature distribution for "cool head and warm foot" can be obtained during a bi-level mode, and temperature of air blown from the foot opening can be made approximately equal to temperature of air blown from the defroster opening during a foot/defroster mode or a foot mode.

According to the present invention, in a vehicle air conditioner, a face opening and a defroster opening are provided at a side of a warm air passage through which air having passed through a heating heat exchanger flows, and a foot opening is provided at a side of a cool air passage through which air having passed through a cooling heat exchanger bypasses the heating heat exchanger. Further, the defroster opening and the foot opening are provided to be offset from the face opening in a vehicle right-left direction. In the vehicle air conditioner, when a bi-level mode where air is blown from both the face opening and the foot opening is set, air from the cool air passage is mainly introduced toward the face opening, and air from the warm air passage is mainly introduced toward the foot opening. On the other hand, when an air outlet mode where air is blown from both the defroster opening and the foot opening is set, after air from the cool air passage and air from the warm air passage are mixed in an inlet part of both the defroster opening and the foot opening, the mixed air is introduced into both the defroster opening and the foot opening. Accordingly, a pleasant temperature distribution for "cool head and warm foot" can be obtained during the bi-level mode, and temperature of air blown from the defroster opening can be made approximately equal to temperature of air blown from the foot opening during a foot/defroster mode or a foot mode.

Preferably, the cool air passage has an outlet portion on a most downstream side at a position approximately corresponding to the face opening, the warm air passage has an outlet portion at a most downstream air side, and the outlet portion of the warm air passage has an enlarged part offset from the outlet portion of the cool air passage in the vehicle right-left direction. Therefore, during the bi-level mode, cool air from the outlet portion of the cool air passage readily flows into the face opening, and warm air from the enlarged portion of the outlet portion of the warm air passage readily flows into the foot opening.

Preferably, a first guide member is disposed to guide air from the warm air passage toward the defroster opening and the foot opening, and a second guide member is disposed to restrict air from the cool air passage from flowing toward the defroster opening and the foot opening. Therefore, the pleasant air temperature distribution for upper and lower sides of a passenger compartment can be readily set.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
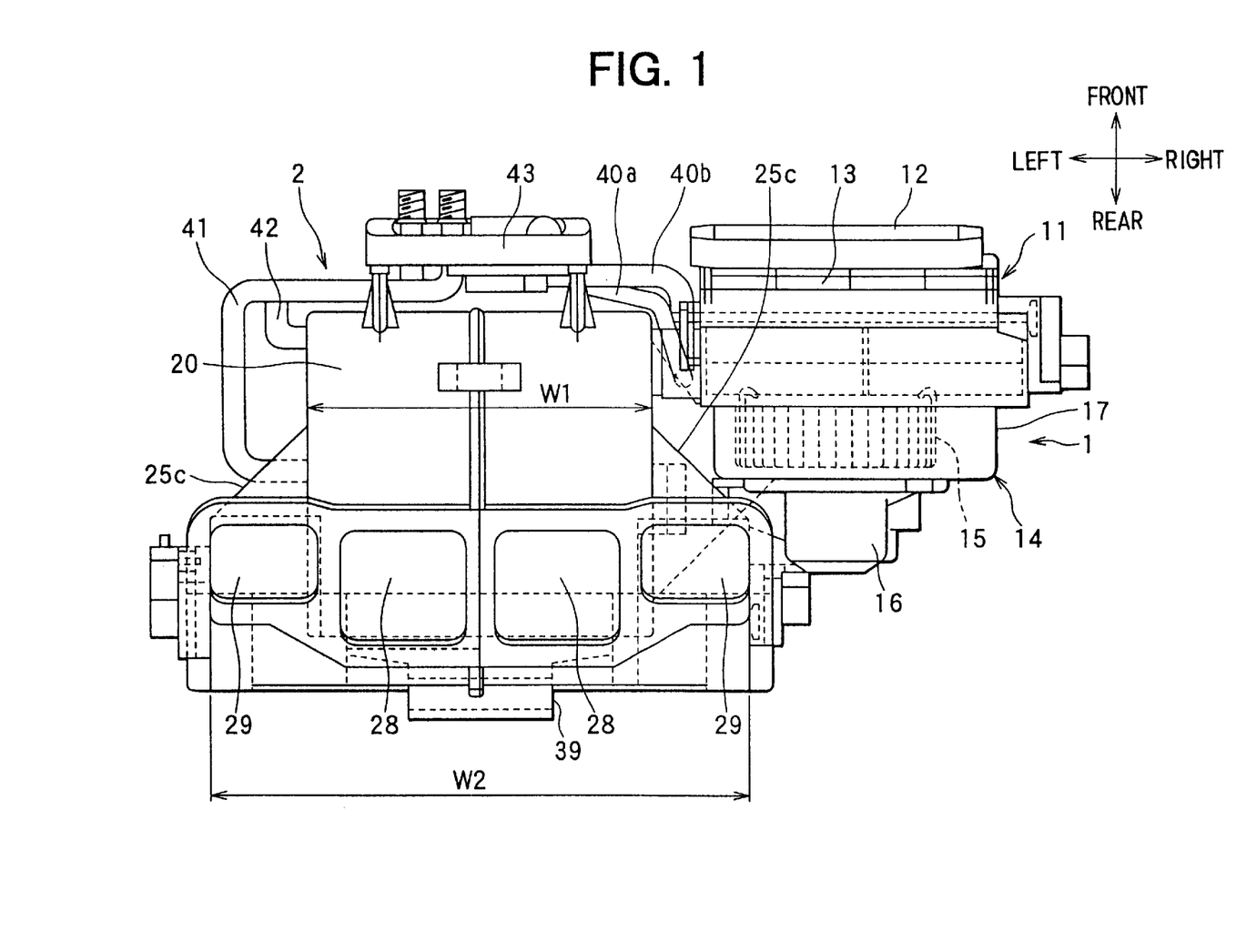
FIG. 1 is a top view of a vehicle air conditioner according to a first preferred embodiment of the present invention.
Figure 2:
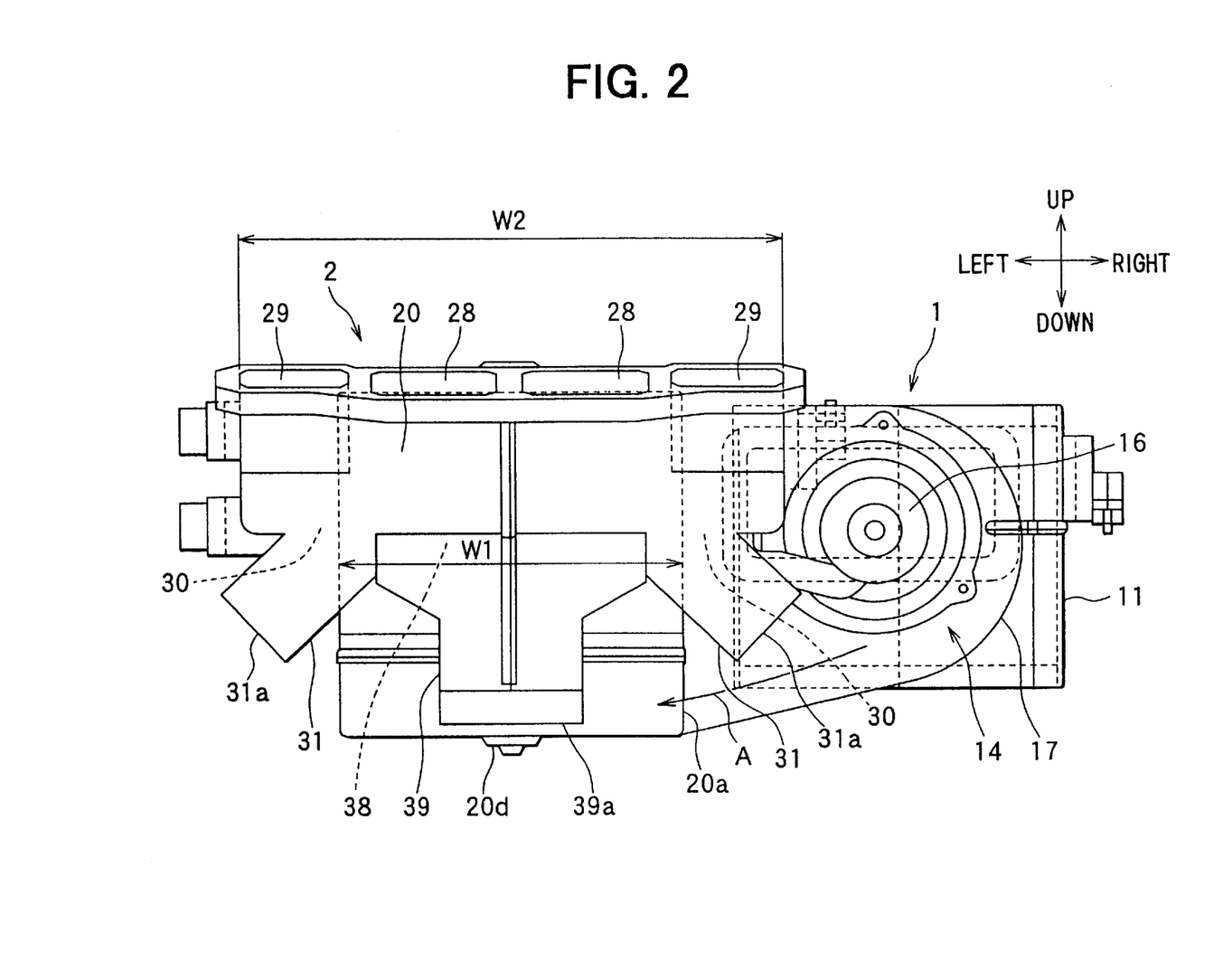
FIG. 2 is a front view of the vehicle air conditioner according to the first embodiment.
Figure 3:
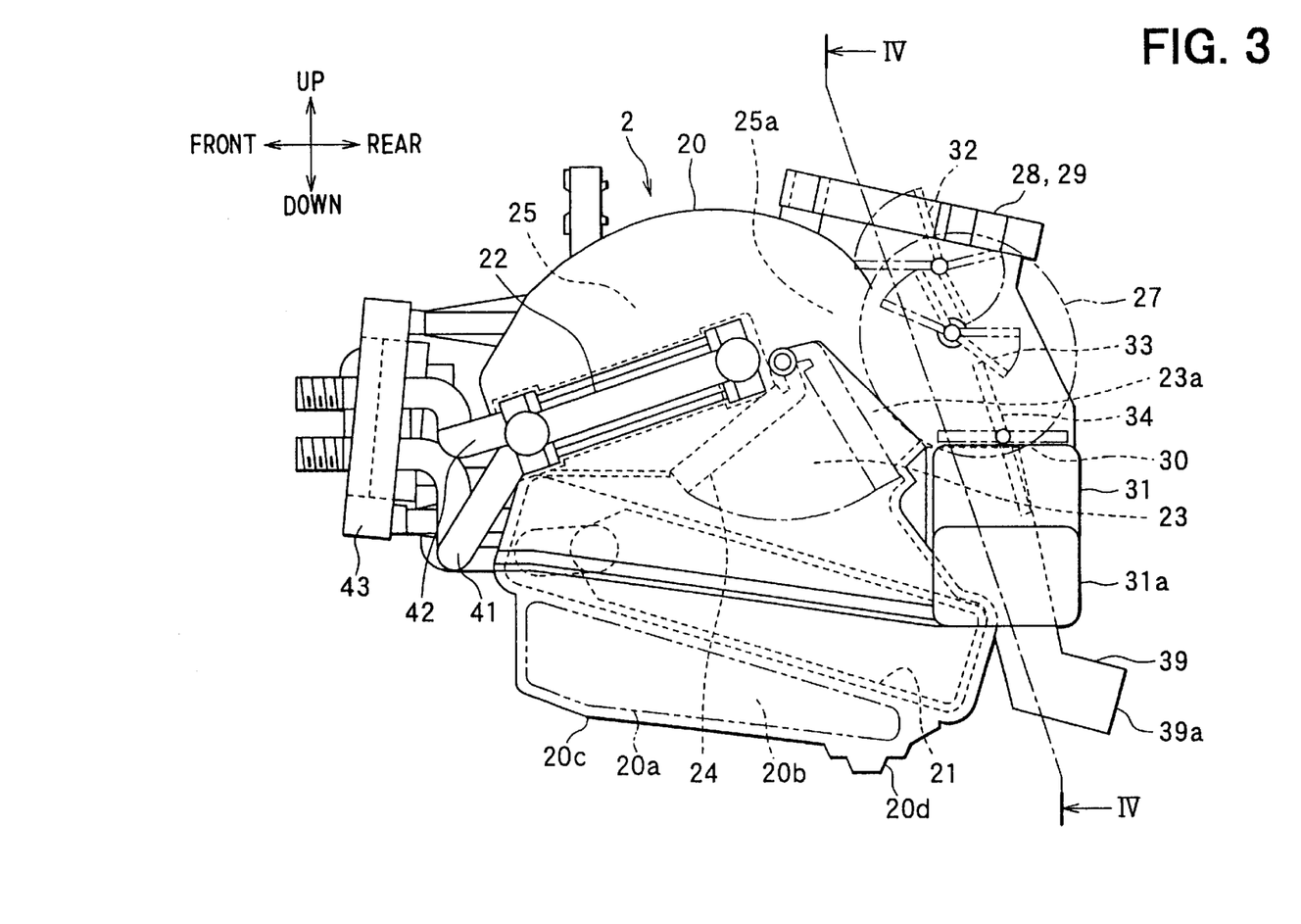
FIG. 3 is a side view of the vehicle air conditioner according to the first embodiment.

A first preferred embodiment of the present invention will be now described with reference to FIGS. 1–9. As shown in FIGS. 1–3, a vehicle air conditioner includes a blower unit 1 and an air conditioning unit 2. The air conditioning unit 2 is disposed at a center portion of an instrument panel in a vehicle right-left direction (i.e., vehicle width direction), and the blower unit 1 is disposed at a front-passenger's seat side to be offset from the air conditioning unit 2 in the vehicle right-left direction. For example, in a vehicle having a left steering wheel, the blower unit 2 is offset to a vehicle right side relative to the air conditioning unit 2. In the first embodiment, air conditioner is mounted on a vehicle to correspond to the arrangements shown in FIGS. 1–3.

As shown in FIG. 1, an inside/outside air switching box 11 for switching and introducing inside air (i.e., air inside the passenger compartment) and outside air (i.e., air outside the passenger compartment) is provided in the blower unit 1 at a vehicle front side. An outside air introduction port 12 is opened in the inside/outside air switching box 11 at a vehicle front side, and an inside air introduction port 13 is opened in the inside/outside air switching box 11 at both vehicle upper and lower sides. An inside/outside air switching door (not shown) for opening and closing the outside air introduction port 12 and the inside air introduction port 13 are disposed in the inside/outside air switching box 11. A blower 14 is disposed at a vehicle rear side of the inside/outside air switching box 11, in the blower unit 1. The blower 14 is constructed by a blower fan 15 that is a centrifugal fan (scirocco fan), a driving motor 16 for driving the blower fan 15, and a scroll casing 17 for accommodating the blower fan 15.

The blower 14 is disposed, so that a rotation shaft of the blower fan 15 is in a vehicle front-rear direction, and an air-flowing width of the scroll casing 17 is enlarged in a scroll direction from a vehicle right side to a vehicle left side, as shown in FIG. 2. Therefore, when the blower fan 15 rotates, air is blown from the blower fan 15 as shown by arrow A in FIG. 2 along the scroll direction of the scroll casing 17, from the vehicle right side to the vehicle left side.

Next, the air conditioning unit 2 will be described in detail. The air conditioning unit 2 has an air conditioning case 20 made of resin, for defining an air passage. The air conditioning case 20 is composed of plural division case parts, and is formed into an approximate box-like shape by connecting the plural division case parts after various components of the air conditioning unit 2 are accommodated. As shown in FIGS. 2 and 3, an air inlet 20a is opened at a most lower side in the air conditioning case 20 on a front-passenger's seat side surface (i.e., vehicle right side surface). That is, as shown in FIG. 3, the air inlet 20a is provided at a lower side under an evaporator (i.e., cooling heat exchanger) 21 to be enlarged in the vehicle front-rear direction.

Figure 5:
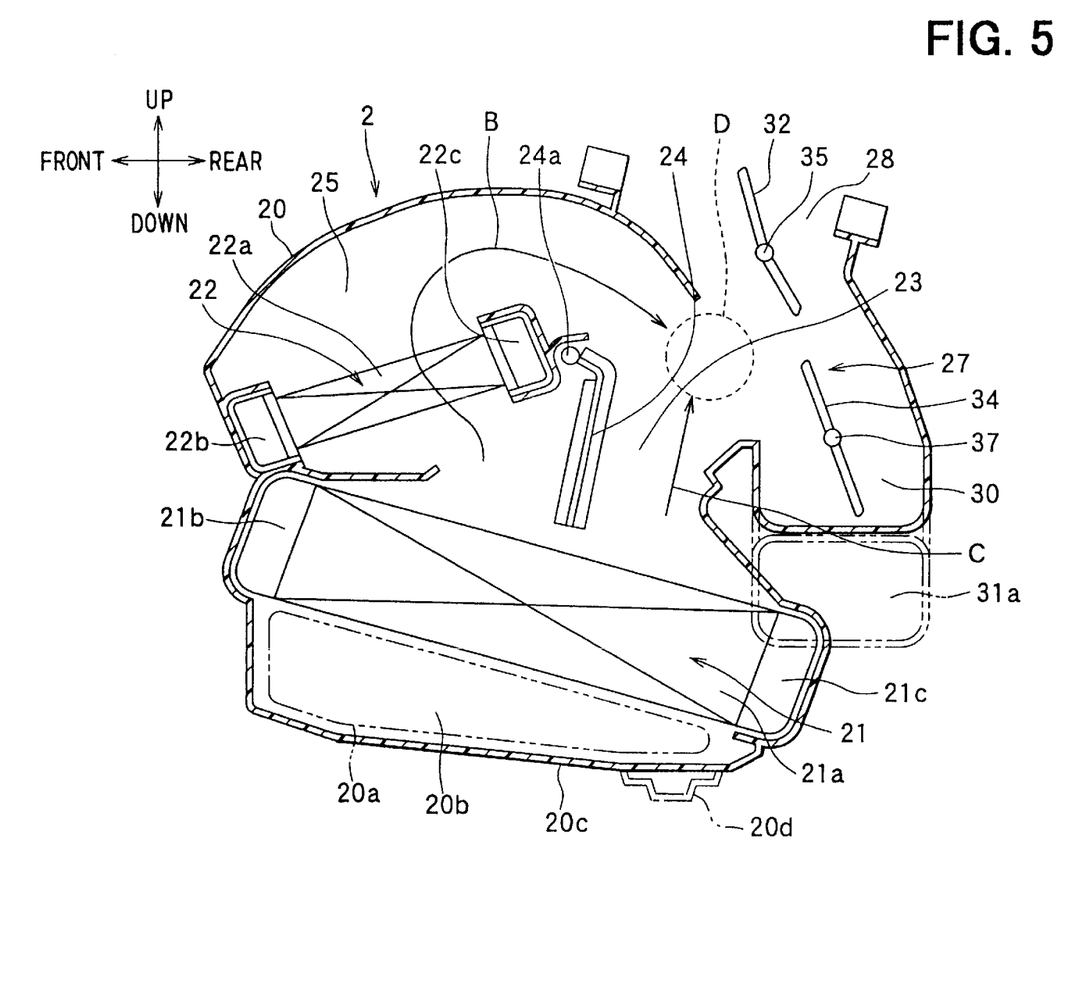
FIG. 5 is a schematic sectional view taken along line V—V in FIG. 4 during a bi-level mode.
Figure 6:
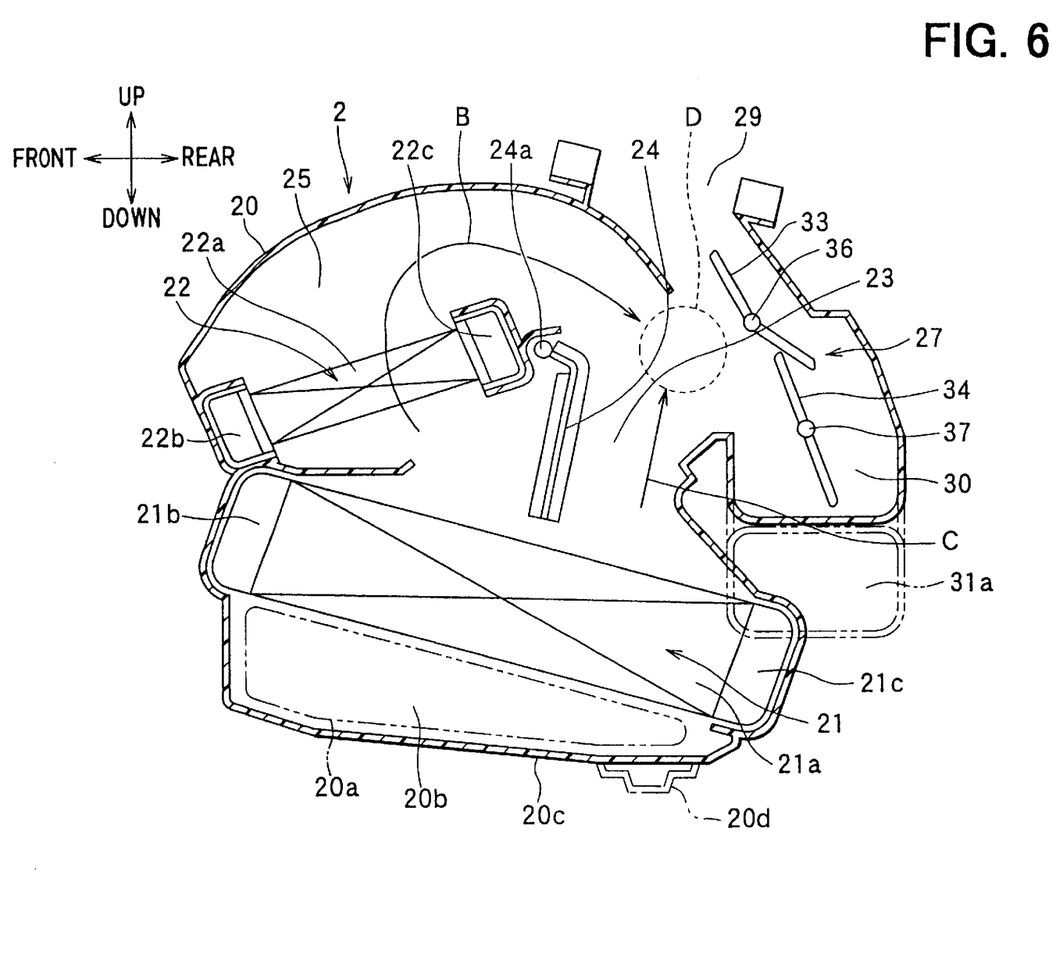
FIG. 6 is a schematic sectional view taken along line VI—VI in FIG. 4 during a foot/defroster mode.

The air inlet 20a is connected to an outlet portion of the scroll casing 17, so that air blown by the blower fan 15 flows into the air inlet 20a. As shown in FIGS. 5 and 6, air blown from the air inlet 20a flows into an air-flowing space 20b under the evaporator 21.

The evaporator 21 is disposed at a position above the air-flowing space 20b so that a heat-exchanging surface (air inlet surface) of the evaporator 21 is positioned approximately horizontally to be slightly tiled. Therefore, air blown by the blower unit 1 is introduced into the heat exchanging surface of the evaporator 21 from a lower side, and passes through the evaporator 21 upwardly from below.

In the evaporator 21, low-pressure refrigerant of a refrigerant cycle absorbs evaporation-latent heat from air passing through the evaporator 21, so that air passing through the evaporator 21 is cooled. As shown in FIGS. 5 and 6, the evaporator 21 includes a core portion 21a for performing a heat-exchange, and both tank portions 21b, 21c disposed at both sides of the core portion 21a. The core portion 21a is composed of plural flat tubes made of metal such as aluminum having a sufficient corrosion resistance performance, and plural corrugated fins each of which is connected between adjacent flat tubes. Both the tank portions 21b, 21c for distributing refrigerant into the plural flat tubes or collecting refrigerant from the plural flat tubes are connected to both ends of each flat tube in a tube longitudinal direction. As shown in FIGS. 3, 5, 6, the tank portion 21b is disposed at a vehicle front side of the core portion 21a, and the tank portion 21c is disposed at a vehicle rear side. The evaporator 21 is slightly tilted relative to a horizontal surface by a predetermined angle (e.g., 25°) so that the tank portion 21b at the vehicle front side becomes higher and the tank portion 21c at the vehicle rear side becomes lower.

With this arrangement of the evaporator 21, the heat-exchanging surface of the evaporator 21 is tilted in a direction (i.e., the vehicle front-rear direction) approximately perpendicular to the air-flowing direction A (i.e., vehicle right-left direction) from the blower 14. Accordingly, a flow direction (i.e., vehicle front-rear direction) of refrigerant in the core portion 21a of the evaporator 21 is approximately perpendicular to the air-flowing direction A.

A bottom surface 20c of the air conditioning case 20 is formed to become lower from a vehicle front side to a vehicle rear side, and a drain hole 20d is opened in the bottom surface 20c at a lowest position on the vehicle rear side. Accordingly, condensed water falling onto the bottom surface 20c of the air conditioning case 20 can be discharged to a vehicle outside through the drain hole 20d and a drain pipe (not shown).

A heater core (i.e., heating heat exchanger) 22 is disposed approximately horizontally in the air conditioning case 20 at a downstream air side of the evaporator 21. In the first embodiment, the heater core 22 is disposed on an upper side of the evaporator 21 at a vehicle front side position. Specifically, the heater core 22 is disposed to be slightly tilted by a predetermined angle in a direction opposite to the tilted direction of the evaporator 21, so that a front side end of the heater core 22 becomes lower and a rear side end of the heater core 22 becomes higher. The heater core 22 heats air passing therethrough by using engine-cooling water (hot water) as a heating source. The heater core 22 includes a core portion 22a for performing a heat exchange between air and the engine-cooling water, and tank portions 22b and 22c at both end sides of the core portion 22a.

The core portion 22a of the heater core 22 is composed of plural flat tubes made of metal such as aluminum having a sufficient corrosion resistance performance, and plural corrugated fins each of which is connected between adjacent 20 flat tubes. Both the tank portions 22b, 22c for distributing hot water into the plural flat tubes or collecting hot water from the plural flat tubes are connected to both ends of each flat tube in a tube longitudinal direction. The heater core 22 is disposed at the vehicle front side so that a cool air passage 23 through which cool air having passed through the evaporator 21 bypasses the evaporator 21 is formed at a vehicle rear side of the heater core 22.

An air mixing door 24 for adjusting a ratio between an amount of warm air passing through the heater core 22 and an amount of cool air passing through the cool air bypass passage 23 is disposed between the evaporator 21 and the heater core 22 to be rotatable around a rotation shaft 24a. By adjusting a rotation position of the air mixing door 24, the ratio between the warm air amount and the cool air amount is adjusted, and the temperature of air blown into the passenger compartment is adjusted.

A warm air passage 25 is provided at an upper side of the heater core 22 within the air conditioning case 20 to be bent and to extend from a vehicle front side to a vehicle rear side, so that warm air from the heater core 22 flows through the warm air passage 25 while bending from the vehicle front side to a vehicle rear side. Therefore, in the first embodiment, the warm air passage 25 is positioned at an upper side of the cool air passage 23 in a vehicle up-down direction. Thus, as shown in FIGS. 5, 6, warm air B from the warm air passage 25 and cool air C from the cool air passage 23 are mixed at a mixing portion D on a downstream air side of the warm air passage 25 and the cool air passage 23, so that conditioned air having a predetermined temperature is obtained.

Next, a mode switching portion 27 indicated in FIG. 3 will be now described in detail. The mode switching portion 27 is for switching an air outlet mode for the passenger compartment. As shown in FIGS. 1, 2, a width dimension of the air conditioning case 20 in the vehicle right-left direction is set so that a width dimension W2 at a vehicle upper rear side of the air conditioning case 20 is enlarged at both vehicle right and left sides, as compared with a width dimension W1 at a vehicle lower front side. A case portion having the width dimension W1 in the air conditioning case 20 is a part for accommodating the evaporator 21, the heater core 22 and the like. On the other hand, a case portion having the width dimension W2 in the air conditioning case 20 is a part for providing the mode switching portion 27.

As shown in FIGS. 1–3, a face opening 28 is opened in the air conditioning case 20 on an upper surface side at a vehicle rear middle part within a range of the width dimension W1. The face opening 28 communicates with face air outlets from which air is blown toward a front upper side (i.e., passenger's head side) of the passenger compartment. Further, on the upper surface side of the air conditioning case 20 at both right and left sides of the face opening 28, right and left defroster openings 29 are opened. The defroster openings 29 are provided at enlarged parts having the width dimension W2, enlarged from the width dimension W1. That is, the right and left defroster openings 29 are opened to be offset at both right and left sides from the face opening 28 in the vehicle right-left direction. The defroster openings 29 communicate with defroster air outlets (not shown) from which air is blown toward an inner surface of a front windshield of the vehicle.

Further, right and left foot openings 30 are provided at lower sides of the right and left defroster openings 29, at a vehicle rear side position. Accordingly, the foot openings 29 are opened to be also offset at both right and left sides from the face opening 28 in the vehicle right-left direction. The right and left foot openings 30 communicate with right and left foot air outlets 31a through foot air ducts 31 so that conditioned air is blown toward the foot area (a lower side) of a passenger in the passenger compartment.

As shown in FIG. 3, the foot openings 30 are positioned at a lower side of the face opening 28 and the defroster openings 29 in the vehicle up-down direction. Therefore, the face opening 28 and the defroster openings 29 are positioned at the upper side adjacent the warm air passage 25, and the foot openings 30 are positioned at the lower side adjacent the cool air passage 23. That is, the face opening 28 and the defroster openings 29 are at the side of the warm air passage 25, and the foot openings 30 are at the side of the cool air passage 23.

Figure 4:
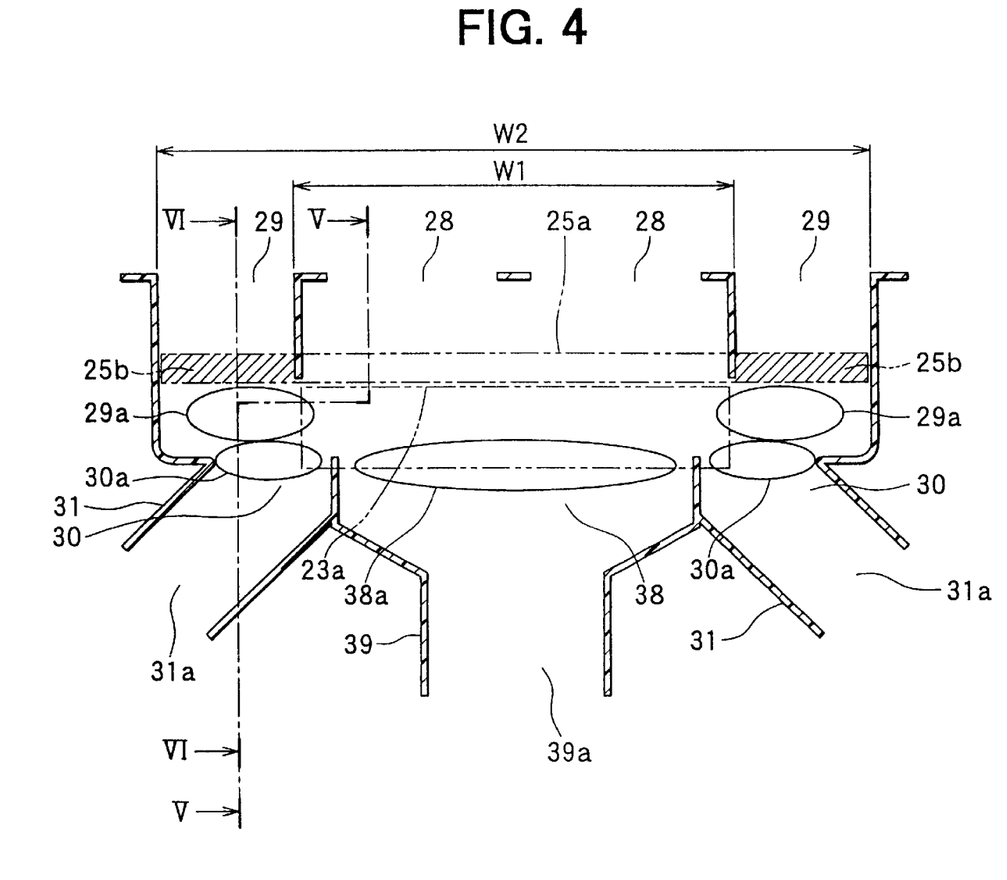
FIG. 4 is a schematic sectional view taken along line IV—IV in FIG. 3, showing a passage structure of a mode switching portion according to the first embodiment.

As shown in FIG. 4, an outlet portion 23a of the cool air passage 23 has a width dimension W1, and is positioned at a center position of the mode switching portion 27 in the vehicle right-left direction. Accordingly, the outlet portion 23a of the cool air passage 23 is provided to correspond to the face opening 28 in the vehicle right-left direction.

On the other hand, an outlet portion 25a of the warm air passage 25 is enlarged to have the width dimension W2. The outlet portion 25a of the warm air passage 25 has enlarged portions 25b enlarged at both sides in the vehicle right-left direction, indicated by the chain line portion in FIG. 4. That is, the warm air passage 25 is enlarged by enlarging passage portions 25c shown in FIG. 1 which is smoothly enlarged from the width dimension W1 to the width dimension W2. Accordingly, among the outlet portion 25a of the warm air passage 25, both the right and left enlarged portions 25b are offset to both right and left sides from the outlet portion 23a of the cool air passage 23 to define an offset warm air outlet in the vehicle right-left direction.

For opening and closing the openings 28–30, mode switching doors such as a face door 32, a defroster door 33, a foot door 34 are disposed to be rotatable by rotation shafts 35, 36, 37, respectively. The face door 32 is formed into one plate-like member and is disposed to open and close the face opening 28 to correspond to the arrangement position of the face opening 28.

The defroster door 33 is formed by two plate-like members, and is disposed to open and close the right and left defroster openings 29. Both of the plate like members of the defroster door 33 are integrally connected to the rotation shaft 36 to be integrally rotated. In the first embodiment, the face door 32 is disposed to be shifted from the defroster door 33 to an upper side, so that an interference between both the rotation shafts 35, 36 of the face and defroster doors 32, 33 can be prevented.

The foot door 34 is formed by two plate-like members to open and close both the right and left foot openings 30.

Both the plate like members of the foot door 34 are integrally connected to a rotation shaft 37 to be integrally rotated. Each one side end of the rotation shafts 35–37 of the doors 32–34 is disposed to protrude to an outside from the air conditioning case 20, and is connected to a link mechanism of a mode door driving mechanism so that the doors 32–34 are rotatably operated by the mode door driving mechanism. The mode door driving mechanism may be an actuator using a motor or may be a manually operated mechanism.

A rear face opening 38 is provided in the rear side surface of the air conditioning case 20 at a lower side of the face opening 28, within the width dimension W1, as shown in FIGS. 2 and 4. A rear face duct 39 communicating with the rear face opening 38 is provided in the air conditioning case 20. A top end opening 39a of the rear face duct 39 is connected to a rear face air outlet through a connection duct so that conditioned air is blown from the rear face air outlet toward the head portion of a rear passenger in the passenger compartment.

The rear face opening 38 always communicate with the outlet portion 23a of the cool air passage 23 and the outlet portion 25a of the warm air passage 25 through a lower side 25 space of the face opening 28. In the first embodiment, the rear face opening 38 is provided at a position proximate to the outlet portion 23a of the cool air passage 23. An air flow from the rear face opening 38 can be interrupted by grills attached to the rear face air outlet, for example. Alternatively, a rear face door (not shown) may be disposed in the rear face duct 39 so that the air flow from the rear face opening 38 can be interrupted.

In FIG. 4, air inlets 29a of the right and left defroster openings 29, air inlets 30a of the right and left foot openings 30 and an air inlet 38a of the rear face opening 38 are schematically indicated by elliptical shapes. In addition, a rear foot opening (not shown) is opened into the front foot air duct 31 so that a part of warm air from the front foot duct 31 is introduced to a vehicle rear lower side.

In FIG. 1, refrigerant pipes 40a, 40b for the evaporator 21 are disposed from a right side surface of the air conditioning case 20 to a frontmost portion of the air conditioning case 20. Further, the water pipes 41, 42 of the heater core 22 are disposed from a left side surface of the air conditioning case 20 to the frontmost portion of the air conditioning case 20. The refrigerant pipes 40a, 40b and the water pipes 41, 42 are joined in a pipe joint portion 43 at the front most portion of the air conditioning case 20. The refrigerant pipes 40a, 40b and the water pipes 41, 42 are extended from the pipe joint portion 43 into an engine compartment.

Next, operation of the vehicle air conditioner according to the first embodiment will be now described. Air introduced from the inside/outside air switching box 11 is blown by the blower fan 15 within the scroll casing 17 as shown by the arrow A from the vehicle right side to the vehicle left side, and flows into the air-flowing space 20b under the evaporator 21 from the air inlet 20a. Thereafter, air passes through the evaporator 21 upwardly from the air-flowing space 20b to be dehumidified and cooled. A part of cool air from the evaporator 21 is introduced into the heater core 22, and the other part of cool air from the evaporator 21 is introduced into the cool air passage 23 in accordance with 10 the rotation position of the air mixing door 24. Air introduced into the heater core 22 is heated by the heater core 22 to be warm air B, and passes through the warm air passage 25, as shown in FIGS. 5 and 6. Further, as shown in FIGS. 5 and 6, warm air B from the warm air passage 25 and cool air from the cool air passage 23 are mixed at the air mixing portion D so that conditioned air having a predetermined temperature is obtained.

Conditioned air is introduced into at least one of the face opening 28, the defroster openings 29 and the foot openings 30 by the switching operation of the mode switching doors 32, 33, 34, and is blown into the passenger compartment.

In the first embodiment of the present invention, during a bi-level mode or a foot/defroster mode where air is blown into the passenger compartment from both upper and lower sides, upper and lower temperature distribution of air blown into the passenger compartment can be suitably set.

Figure 7:
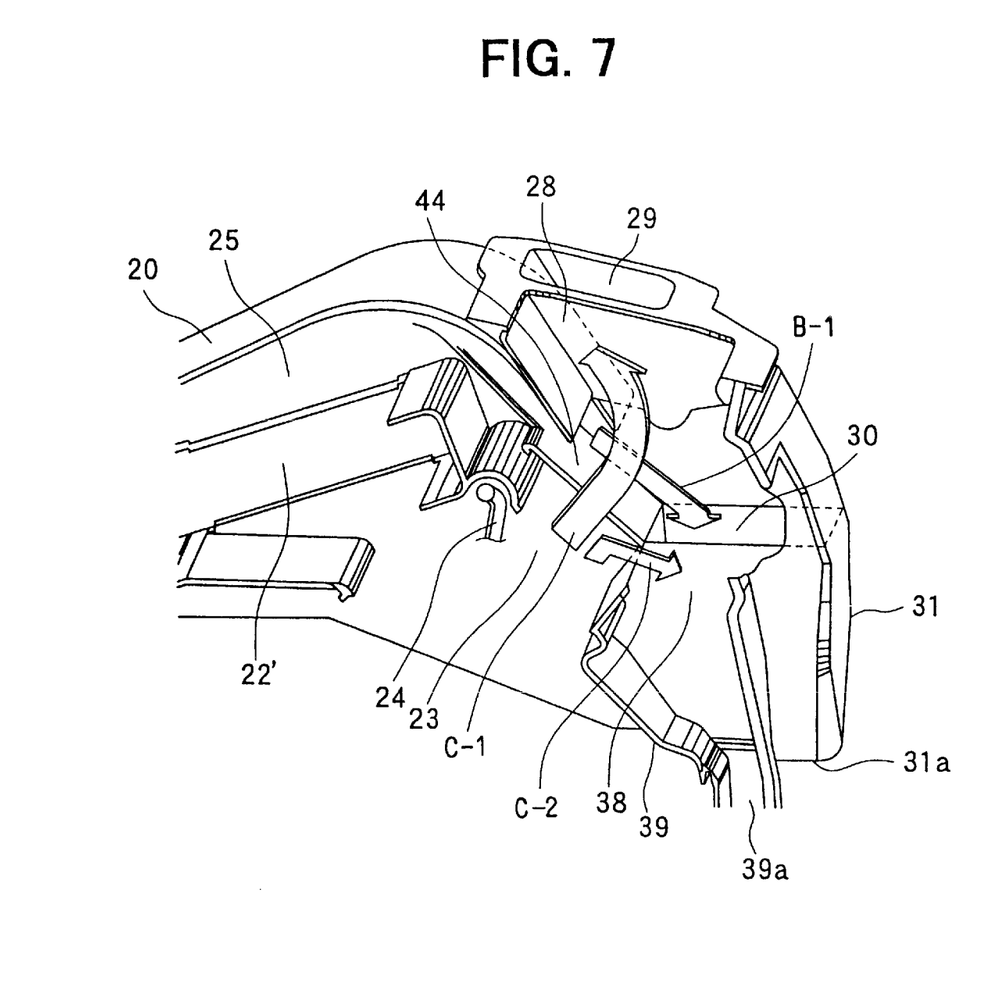
FIG. 7 is a partially-sectional perspective view showing a main part of an air conditioning case during a bi-level mode, according to the first embodiment.

When the bi-level mode is set as shown in FIGS. 5 and 7, the face opening 28 and the foot openings 30 are opened.

The outlet portion 23a of the cool air passage 23 is provided to correspond to the center-face opening 28 in the vehicle right-left direction of the mode switching portion 27, and the foot openings 30 are provided to be offset to right and left sides from the outlet portion 23a of the cool air passage 23 in the vehicle right-left direction. Accordingly, cool air from the outlet portion 23a of the cool air passage 23 is difficult to be introduced into the foot openings 30, while being readily introduced into the face opening 28.

In FIG. 7, a cool air flow from the outlet portion 23a of the cool air passage 23 into the face opening 28 is indicated as C-1, and a cool air flow from the outlet portion of the cool air passage 23 into the rear face opening 38 is indicated as C-2.

Because the outlet portion 25a of the warm air passage 25 has the width dimension W2 which extends to both right and left sides of the face opening 28, the enlarged portions 25b offset from the outlet portion 23a of the cool air passage to both right and left sides are formed in the outlet portion 25a of the warm air passage 25. Warm air from the enlarged portions 25b flows toward the foot opening 30 along a wall surface 44 of the air conditioning case 20, as shown by arrow B-1. The wall surface 44 is formed in the air conditioning case 20 to define the enlarged portions 25b. Because the foot opening 30 is positioned on an extending direction of the warm air flow B-1 along the wall surface 44, almost all of the warm air flow B-1 is toward the foot opening 30.

As a result, during the bi-level mode, air having relatively a large cool air ratio is introduced into the face opening 28, and air having relatively a large warm air ratio is introduced into the foot opening 30. Accordingly, the temperature of air blown toward the upper side (head side) of the passenger compartment can be made lower than temperature of air blown toward the lower side (foot side) of the passenger compartment, and a temperature distribution for "cool head and warm foot" can be obtained during the bi-level mode.

The rear face opening 30 is provided at a lower side of the face opening 28 to be positioned at an immediate lower side of the outlet portion 23a of the cool air passage 23. Therefore, as shown in FIG. 7, a large amount of cool air can flow from the outlet portion 23a of the cool air passage 23 into the rear face opening 38. Accordingly, even in the rear seat side of the passenger compartment, the temperature of air blown toward the upper side (head side) of the passenger compartment can be made lower than temperature of air blown toward the lower side (foot side) of the passenger compartment, and a temperature distribution for "cool head and warm foot" can be obtained on the rear seat side during the bi-level mode.

Figure 8:
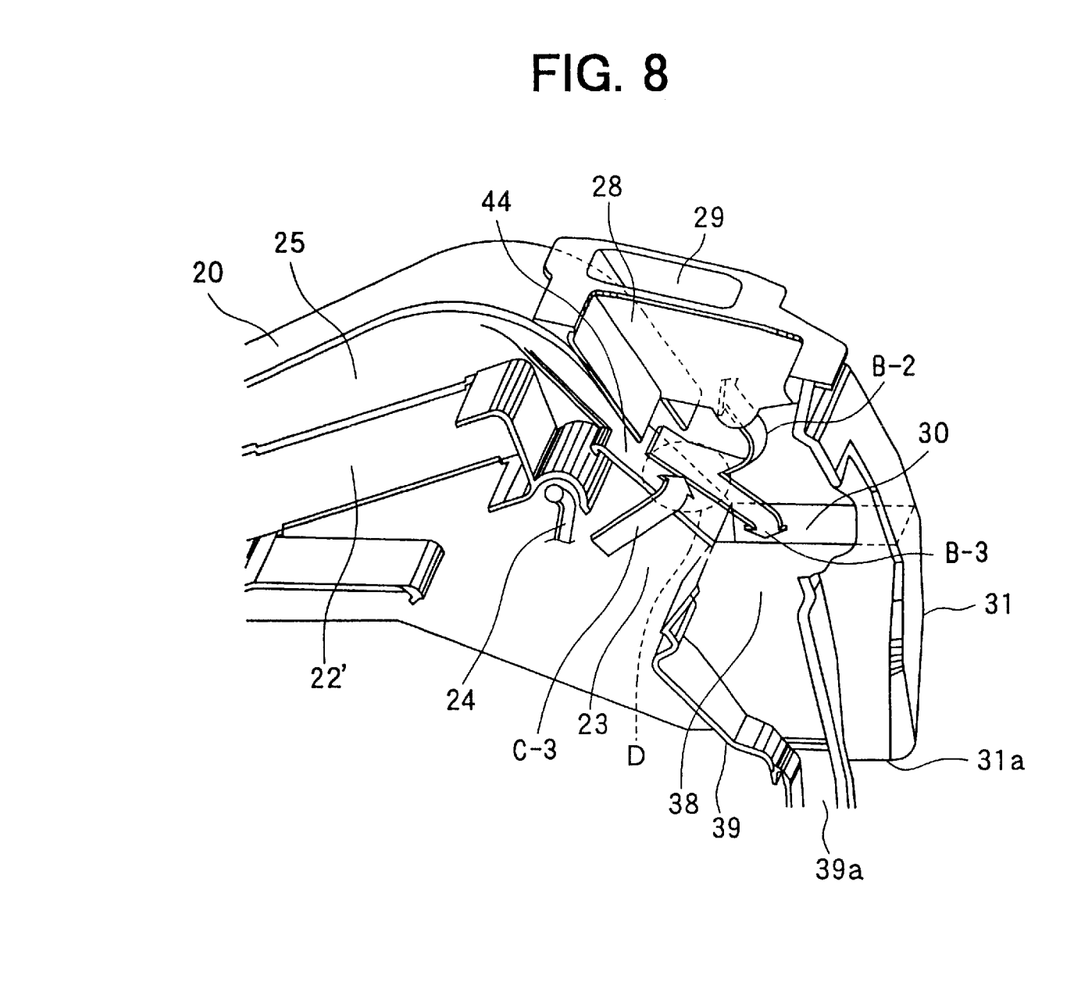
FIG. 8 is a partially-sectional perspective view showing a main part of an air conditioning case during a foot/defroster mode, according to the first embodiment.

When the foot/defroster mode is set as shown in FIGS. 6 and 8, both the defroster openings 29 and the foot openings 30 are opened. At this time, because the face opening 28 is fully closed by the face door 32, cool air from the outlet portion 23a of the cool air passage 23 is branched to right and left sides as shown by arrow C-3 in FIG. 8, and flows into the outer areas, outside the width dimension W1, on the sides of the enlarged portions 25b after passing over the wall surface 44. On the other hand, because the face opening 28 is fully closed by the face door 32, warm air from the outlet portion 25a of the warm air passage 25 is also branched into right and left sides, and flows into the outer area on the side of the enlarged portions 25b along the wall surface 44. In the outer area on the sides of the enlarged portions 25b, that is, in an inlet portion between the defroster opening 29 and the foot opening 30, cool air and warm air are mixed. That is, cool air and warm air are mixed in the mixing portion D provided outside the width dimension W1, as shown in FIG. 8.

Mixed warm air (conditioned air) mixed in the mixing portion D to have a predetermined temperature is branched into a warm air flow B-2 flowing upwardly toward the defroster openings 29 and a warm air flow B-3 flowing downwardly toward the foot openings 30. Accordingly, during the foot/defroster mode, temperature of air blown from the defroster openings 29 is approximately equal to that of air blown from the foot opening 30. As a result, during the foot/defroster mode, it can prevent temperature of air blown from the defroster openings 29 from being greatly lower than that of air from the foot openings 30. Therefore, heating performance of the passenger compartment can be improved during heating operation in the winter, and defrosting performance of the windshield is improved due to the increased air temperature blown from the defroster openings 29.

Figure 9:
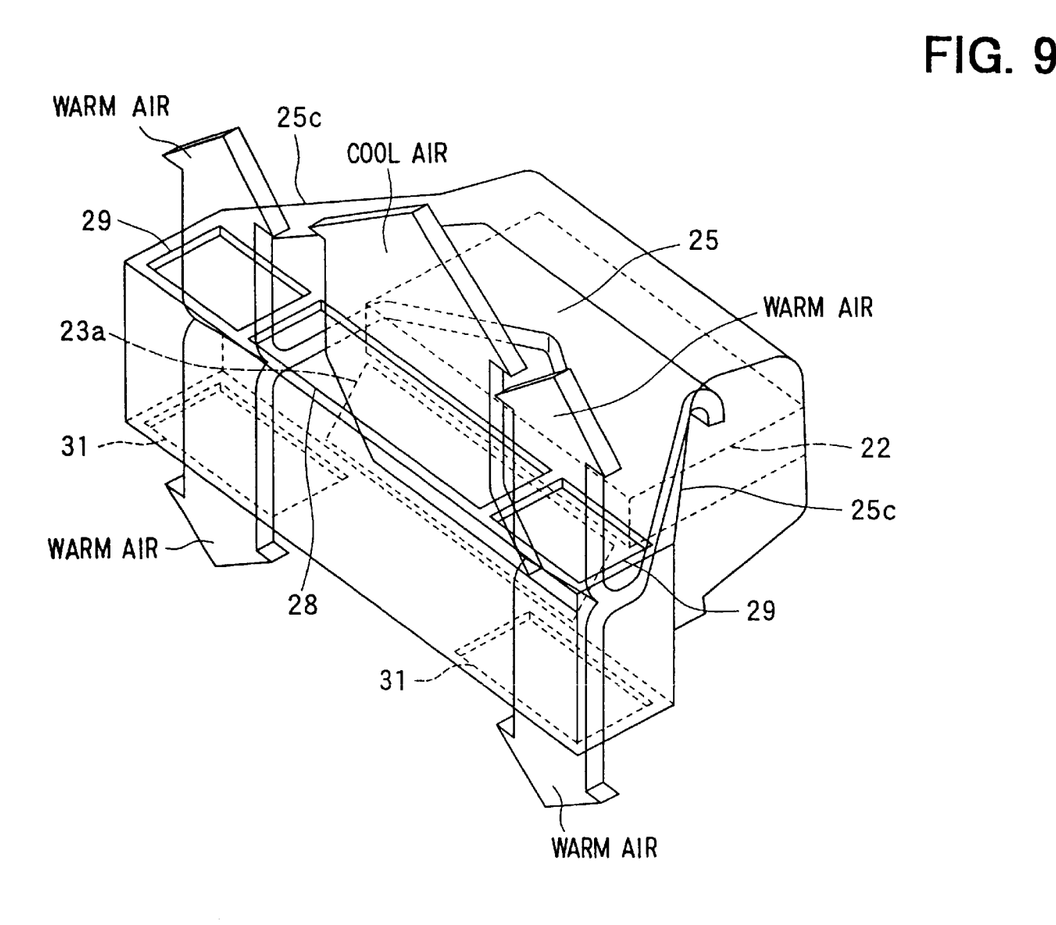
FIG. 9 is a schematic diagram showing flow directions of warm air and cool air in the air conditioning case, according to the first embodiment.

During the foot/defroster mode, generally, the air amount blown from the defroster openings 29 is set to be approximately equal to the air amount blown from the foot openings 30. As compared with the foot/defroster mode, when a foot mode is set, the flow amount ratio of air blown from the foot openings 30 becomes larger. During the foot mode, the other parts are similar to those of the foot/defroster mode. Accordingly, during the foot mode, the temperature of air blown from the defroster openings 29 is approximately equal to that of air blown from the foot opening 30. In FIGS. 7 and 8, the heat core 22 is not indicated, but an arrangement position 22' of the heater core 22 is indicated. FIG. 9 shows plural air-flowing directions, that is, a cool air flowing direction toward the face opening 28, warm air flowing directions toward the defroster openings 29, and warm air flowing directions toward the foot openings 30.

Figure 10:
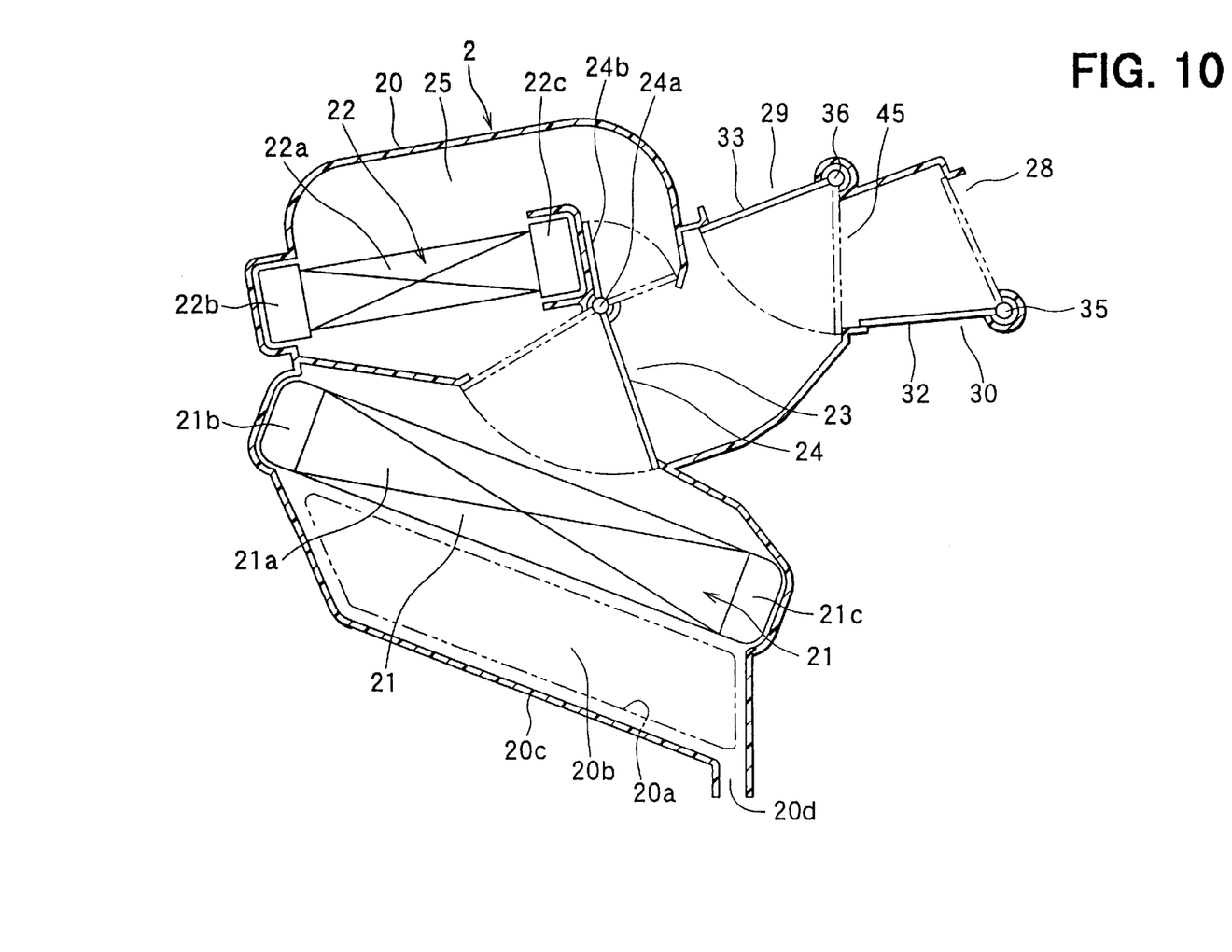
FIG. 10 is schematic sectional view showing a main part of a vehicle air conditioner according to a second preferred embodiment of the present invention.

A second preferred embodiment of the present invention will be now described with reference to FIG. 10.

In the above-described first embodiment, the three doors 32, 33, 34 are used as a mode switching door. In the second embodiment, both doors 32, 33 are used as the mode switching door to selectively switching an air outlet mode, and the number of components of the air conditioning unit 2 can be reduced.

That is, one mode switching door 32 is disposed to open and close the face opening 28 and the foot opening 30, and the other mode switching door 33 is disposed to open and close the defroster opening 29 and a communication path 45. Here, the communication path 45 is provided so that the air mixing portion of the cool air passage 23 and the warm air passage 25 communicates with both the face opening 28 and the foot openings 30 through the communication path 45.

In the second embodiment, a supplementary door 24b is further disposed to be integrated with the air mixing door 24. When a maximum cooling is set, an inlet passage of the heater core 22 is fully closed by the air mixing door 24, and the outlet portion of the warm air passage 25 is fully closed by the supplementary door 24b. Thus, in this case, a hot water valve for interrupting a warm air flow into the heater core 22 in the maximum cooling can be omitted.

In the second embodiment, the other parts are similar to those of the above-described first embodiment, and an effect similar to those of the above-described first embodiment can be obtained.

Figure 11:
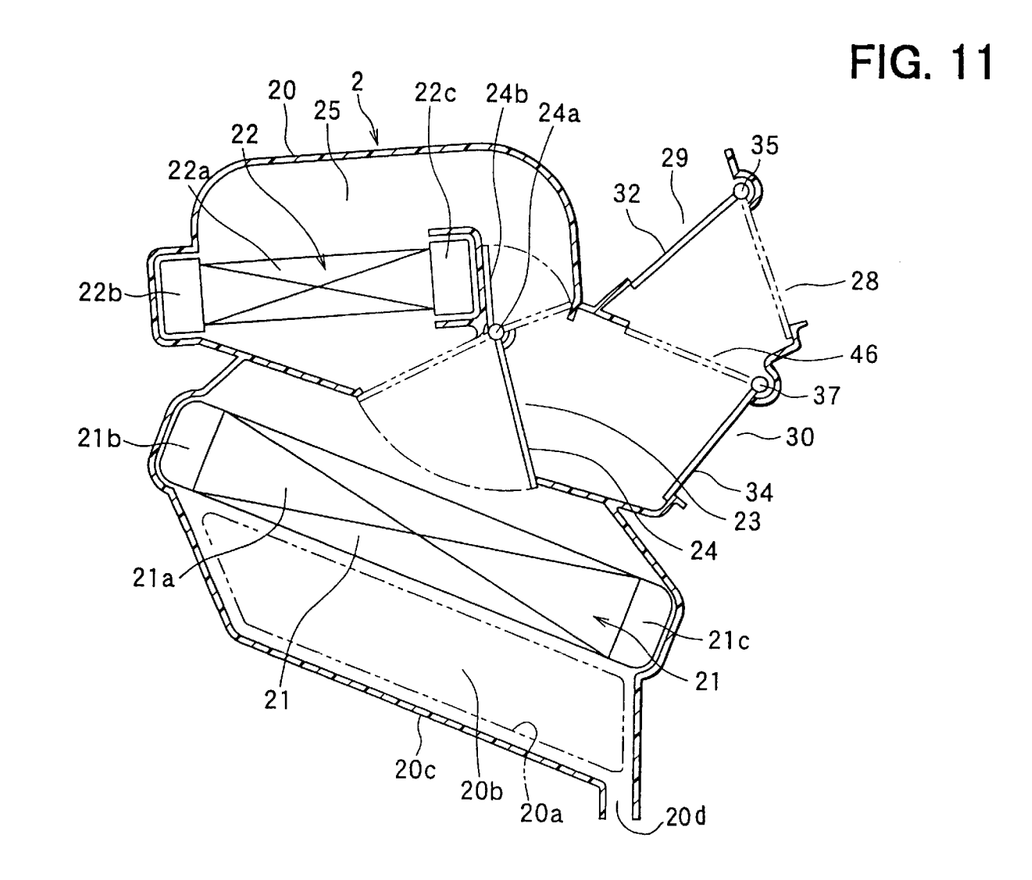
FIG. 11 is schematic sectional view showing a main part of a vehicle air conditioner according to a third preferred embodiment of the present invention.

A third preferred embodiment of the present invention will be now described with reference to FIG. 11. The third embodiment is a modification of the above-described second embodiment of the present invention. In the third embodiment, one mode switching door 32 is disposed to open and close the face opening 28 and the defroster opening 29. On the other hand, an another mode switching door 34 is disposed to open and close the foot opening 30 and a communication path 46. Here, the communication path 46 is provided so that the air mixing portion of the cool air passage 23 and the warm air passage 25 communicates with both the face opening 28 and the defroster opening 29 through the communication path 46.

In the third embodiment, the other parts are similar to those of the above-described second embodiment.

Figure 12:
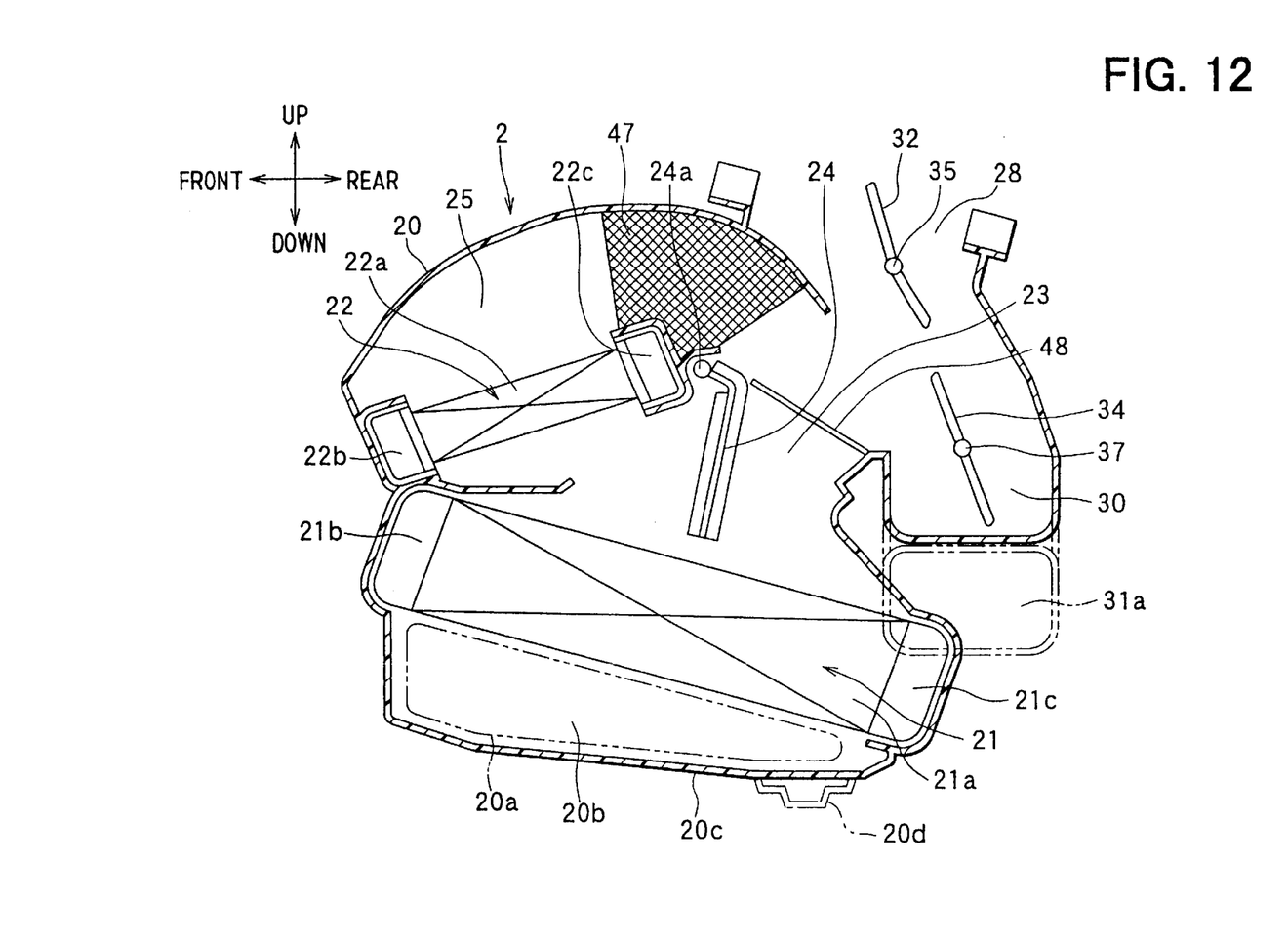
FIG. 12 is schematic sectional view showing a main part of a vehicle air conditioner according to a fourth preferred embodiment of the present invention.

A fourth preferred embodiment of the present invention will be now described with reference to FIGS. 12 and 13. In the above-described first embodiment, the width dimension W2 of the outlet portion 25a of the warm air passage 25 is set larger than the width dimension W1 of the outlet portion 23a of the cool air passage 23. However, in the fourth embodiment, although the outlet side of the warm air passage is not enlarged, the upper and lower air temperature distribution similar to that of the above-described first embodiment can be obtained by additionally providing a guide member.

In the fourth embodiment, similarly to the above-described first embodiment, both the defroster openings 29 and both the foot openings 30 are provided to be offset from the center positioned face opening 28. In addition, a first guide 47 for guiding warm air from the outlet side of the warm air passage 25 to both right and left sides is provided.

Figure 13:
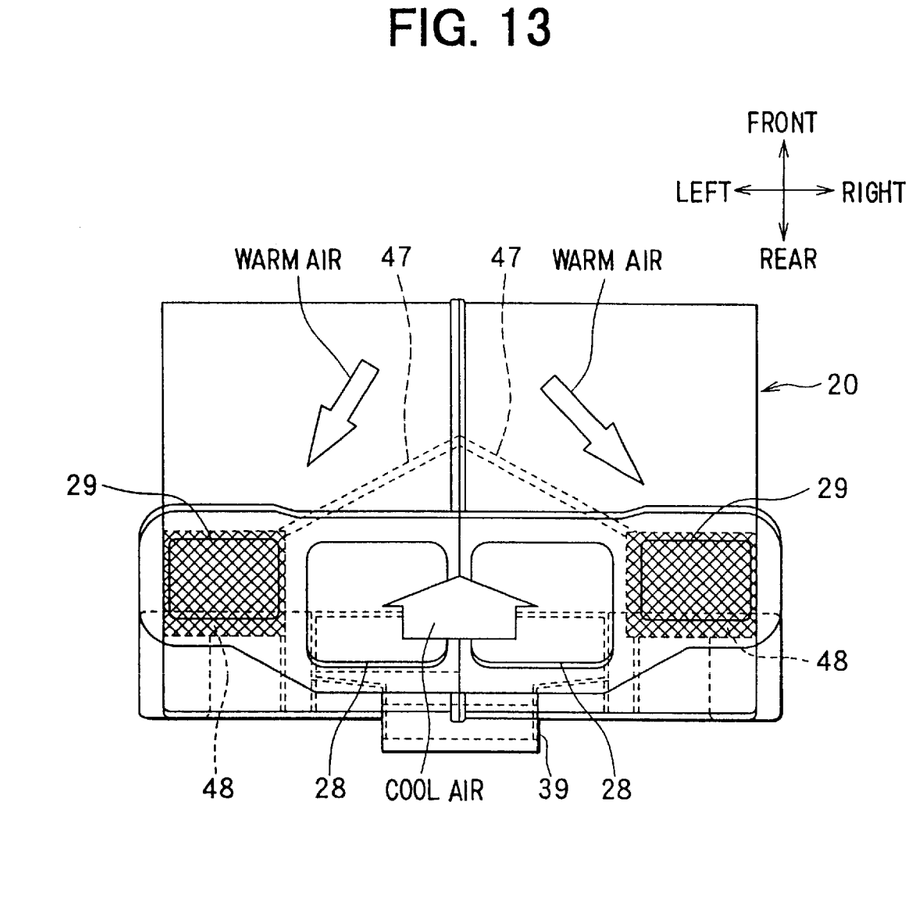
FIG. 13 is a schematic top view showing a part of the vehicle air conditioner according to the fourth embodiment.

As shown in FIG. 13, the first guide 47 is formed into a reverse V-shape, so that a top end of the first guide 47 is positioned at a center position of the warm air passage 25 in the vehicle right-left direction on an upstream air side (vehicle front side) of the warm air passage 25, and both side parts of the first guide 47 is gradually tilted toward the right and left sides. Accordingly, warm air from the outlet side of the warm air passage 25 can be readily guided to the defroster openings 29 and the foot openings 30 offset to both the right and left sides in the vehicle right-left direction.

Further, a second guide 48 is provided at both right and left sides only corresponding to the arrangement positions of the defroster openings 29 and the foot openings 30, so that cool air from an outlet side of the cool air passage 23 is introduced toward the face opening 28 while being prevented from being introduced into the defroster openings 29 and the foot openings 30. As a result, the amount of cool air introduced into the face opening 28 becomes larger than the air amount of cool air introduced into the foot openings 30 and the defroster openings 29. Accordingly, the temperature of air blown toward the upper side (head side) of the passenger compartment can be made lower than temperature of air blown toward the lower side (foot side) of the passenger compartment, and a temperature distribution for "cool head and warm foot" can be obtained during the bi-level mode.

On the other hand, during the foot/defroster mode, because the face opening 28 is fully closed, cool air from the outlet side of the cool air passage 33 is introduced into the defroster openings 29 and the foot openings 30 after passing over the second guide 48. Further, warm air from the outlet side of the warm air passage 25 is introduced into the inlet sides of the right and left defroster openings 29 and the foot openings 39, while being guided by the first guide 47. Accordingly, after cool air and warm air are mixed at the inlet sides of the defroster openings 29 and the foot openings 30, the mixed warm air having a predetermined temperature is branched to be introduced upwardly toward the defroster openings 29 and to be introduced downwardly toward the foot openings 30. Thus, during the foot/defroster mode, the temperature of air blown toward the lower side of the passenger compartment can be made approximately equal to the temperature of air blown toward the windshield. As a result, during the foot/defroster mode, it can prevent temperature of air blown from the defroster openings 29 from being greatly lower than that of air from the foot openings 30, the heating performance of the passenger compartment can be improved during heating operation in the winter, and the defrosting performance of the windshield is improved due to the increased air temperature blown from the defroster openings 29.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An air conditioner for a vehicle having a passenger compartment, said air conditioner comprising:

an air conditioning case for defining an air passage through which air is blown into the passenger compartment, said air conditioning case having a face opening through which air is blown toward a front upper side of the passenger compartment, a pair of defroster openings through which air is blown toward a windshield of the vehicle, and a pair of foot openings through which air is blown toward a lower side of the passenger compartment;

a cooling heat exchanger for cooling air in said air passage, said cooling heat exchanger having a cooling air inlet surface which is disposed more horizontal than vertical in said air conditioning case;

a heating heat exchanger for heating air passing through said heating heat exchanger, said heating heat exchanger having a heating air inlet surface disposed more horizontal than vertical in said air conditioning case at a downstream air side of said cooling heat exchanger above said cooling heat exchanger to form a cool air passage through which air from said cooling heat exchanger bypasses said heating heat exchanger and to form a warm air passage through which air having passed through said heating heat exchanger flows; and a mode switching member for selectively opening and closing said face opening, said defroster openings and said foot openings, said mode switching member being disposed at a vehicle rear side relative to said heating heat exchanger, wherein:

said cool air passage is provided at a vehicle rear side of said heating heat exchanger in a vehicle front-rear direction;

said air passage has an air mixing chamber at a vehicle rear side of said heating heat exchanger In the vehicle front-rear direction, in which air from said warm air passage and air from said cool air passage are mixed;

said face opening and said defroster openings are provided at a downstream air side of said air mixing chamber above said air mixing chamber;

said foot openings is are provided at a the downstream air side of said air mixing chamber below said air mixing chamber;

said defroster openings are provided at opposite sides of said face opening in a vehicle width direction;

each of said foot openings is disposed under a respective defroster opening;

the air conditioning case has a an enlarged passage portion in which a passage sectional area of said warm air passage is enlarged at opposite sides in the vehicle width direction, from a first position immediately after said heating heat exchanger to a second position of said face opening and said defroster openings; and said enlarged passage portion has an air outlet portion that is provided opposite to said defroster openings and said foot openings.

2. The air conditioner according to claim 1, wherein:

said air conditioning case further has an air inlet from which air is introduced to be supplied to said cooling heat exchanger; and said air inlet is provided at a position under said cooling heat exchanger.

3. The air conditioner according to claim further comprising:

an air mixing door disposed in said air conditioning case to adjust an air amount passing through said cool air passage and an air amount passing through said warm air passage.

4. The air conditioner according to claim 1, wherein: said air conditioning case further has a rear face opening through which air is blown toward a rear upper side of the passenger compartment;

said rear face opening is provided at a position proximate to an outlet side of said cool air passage; and said defroster openings and said foot openings are each provided at opposite sides of said face opening and said rear face opening in the vehicle width direction.

5. The air conditioner according to claim 1, wherein said passage enlarged portion of said warm air passage has a width dimension that is larger than a width dimension of said cool air passage.

* * * * *